Dec. 30, 1969 G. E. PIHL 3,487,403
ELECTROMAGNETIC INDICATOR HAVING ROTATING SPHERES
Filed Oct. 6, 1965 2 Sheets-Sheet 1
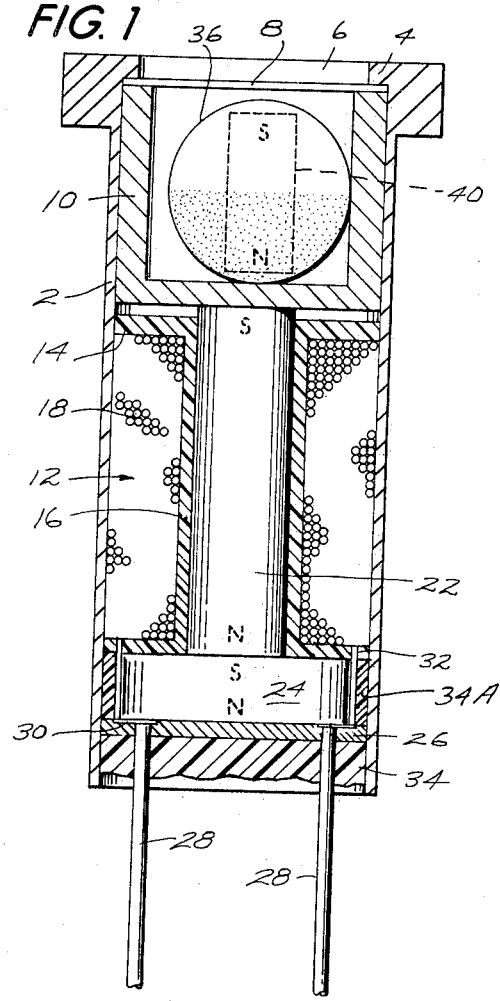
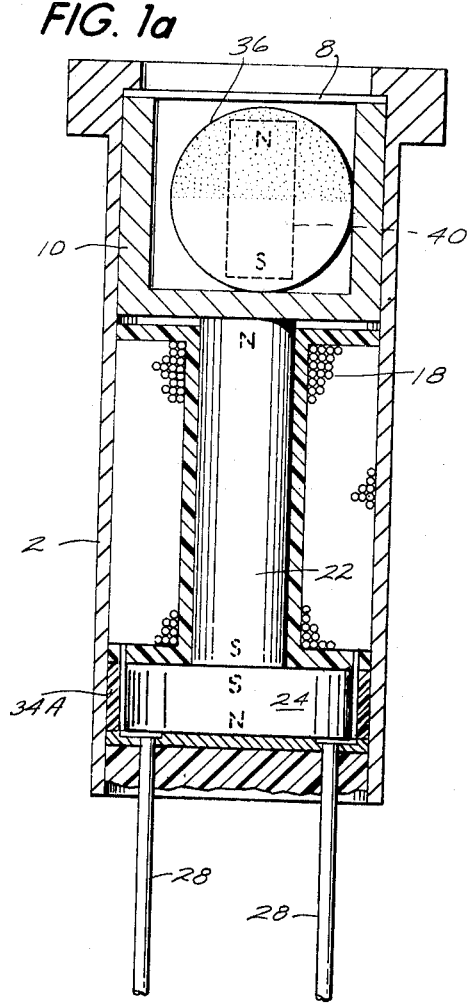
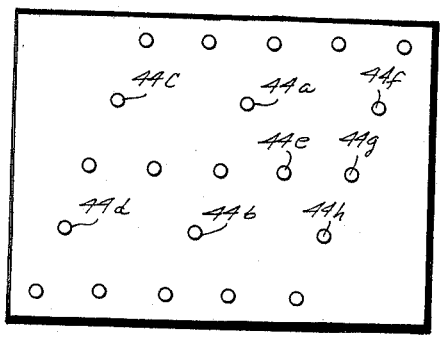
INVENTOR
GEORGE E. PIHL
BY
Nicholas A. Pandiscio
ATTORNEY Dec. 30, 1969  G. E. PIHL  3,487,403
ELECTROMAGNETIC INDICATOR HAVING ROTATING SPHERES
Filed Oct. 6, 1965  2 Sheets-Sheet 2
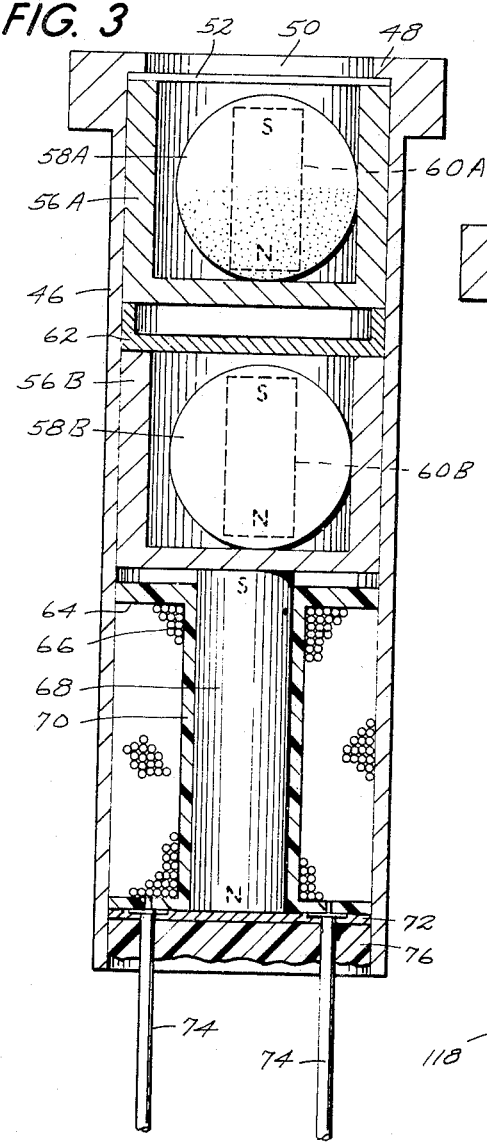
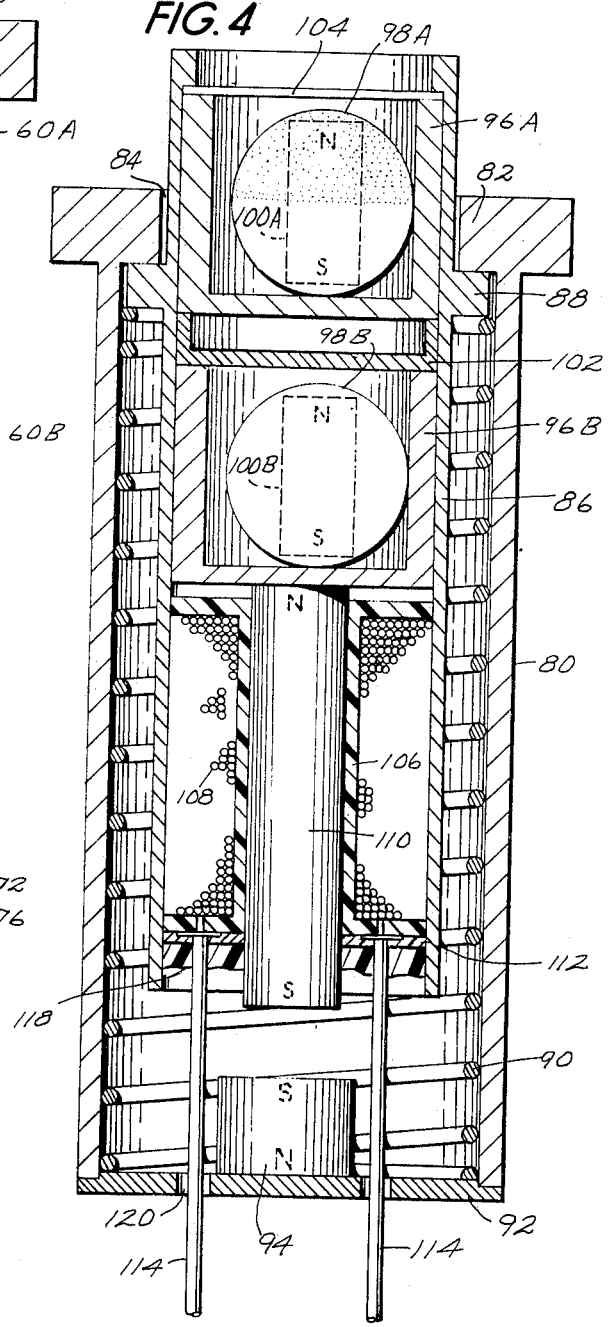
INVENTOR
GEORGE E. PIHL
BY
ATTORNEY

United States Patent Office 3,487,403
Patented Dec. 30, 1969

3,487,403
ELECTROMAGNETIC INDICATOR HAVING ROTATING SPHERES
George E. Pihl, Abington, Mass., assignor to Miniature Electronic Components Corp., Holbrook, Mass., a corporation of Massachusetts
Filed Oct. 6, 1965, Ser. No. 493,314
Int. Cl. G08b 5/00, 23/00
U.S. Cl. 340—373          9 Claims

ABSTRACT OF THE DISCLOSURE

An electromagnetic indicator in the form of an electromagnetic core which acts upon a free, ball-shaped rotor having a permanent bar magnet therein and which is freely rotatable in a receptacle of polytetrafluoroethylene, to occupy one polar orientation or the other depending upon the polarity of the core. In one embodiment, the first rotor acts upon a second, similar rotor which is distinctively finished and viewable through a window to provide indication of the state of magnetism in the core. The permanent magnetism tends to latch the rotor, or rotors, in position until intentionally reversed by magnetism of opposite polarity.

---

This invention relates to electromagnetic indicators and more particularly relates to binary electromagnetic indicators.

Electromagnetic indicators are preferred over luminescent indicators such as those using glow tubes or bulbs where the ambient light conditions make it difficult to distinguish the illuminated display from the surrounding background. Electromagnetic indicators also are preferred where the installation is subject to shock or where replacement of parts is difficult or where the changes in ambient temperature are large enough to accelerate deterioration of glow tubes and the like. Although many different electromagnetic indicators have been devised, there remains the need for a simple and inexpensive miniature electromagnetic indicator that is capable of two display conditions.

Accordingly, it is an object of the present invention to provide an electromagnetic indicator which is capable of indicating two different states or conditions, which is simple and long-lived, having only two, and in some cases only one, moving part, which is highly reliable under all conditions, requiring only a small amount of energy to convert from one state to the other, and which is capable of automatic latching of the indicating element. It is therefore an object to provide an electromagnetic indicator which is not only inexpensive but highly compact and thus suited for use in an alpha-numeric array.

It is a related object to provide an indicator which is capable of use in simplified form at lowest possible cost and which may, with minimum complication, be used in a magnetically self-latching mode to achieve the highest degree of reliability under conditions of shock or vibration. It is a further object to provide an indicator which is highly versatile and which may be reset either electrically or mechanically.

Other objects and many of the attendant advantages of the present invention will become more readily apparent as reference is had to the following detailed specification which is to be considered together with the accompanying drawings wherein:

FIG. 1 is a longitudinal sectional view of a preferred embodiment of the invention in one display condition;

FIG. 1A is a view similar to FIG. 1 but showing the second display condition of the preferred embodiment;

FIG. 2 is a plan view of a plurality of electromagnetic indicators constructed according to the present invention, and arrayed to function as an alpha-numeric display system;

FIG. 3 is a longitudinal sectional view of a second embodiment capable of bistable operation; and FIG. 4 is a longitudinal sectional view of a third embodiment which is adapted to be manually reset.

Turning first to FIG. 1, the preferred embodiment selected for illustration comprises a cylindrical aluminum housing 2 which, as formed, is open at both ends. One end of the housing, hereinafter termed the "top end," is formed with an inwardly extending flange 4 which defines a display window 6 and acts as a shoulder to support a suitable transparent member 8 formed of plastic or glass. Disposed within the housing and engaging the edge of the transparent pane 8 is a cylindrical plastic cup 10. The pane 8 may be cemented to flange 4 or may be held against flange 4 by the cup 10. Preferably cup 10 is formed of a material having a low coefficient of friction, e.g. polyfluoroethylene plastic such as "Teflon."

Disposed in the housing below the cup 10 is a magnetic assembly identified generally by the numeral 12. This assembly comprises a bobbin or coil form 14 having a hollow stem 16 and carrying a coil of insulated wire 18. Disposed in the stem of the bobbin is a core 22 of magnetic material. The top end of the core protrudes above the bobbin 14 and presses against the cup 10. Cemented to the bottom end of the core and also to the bottom end of the bobbin is a ceramic permanent magnet in the form of a disc 24. The magnet is polarized axially with one pole proximate to bobbin 14 and the other pole remote from the bobbin. In the illustrated embodiment, the disc is oriented so that its south pole is closest to the bobbin.

Cemented to the underside of the permanent magnet disc is a tabbing board 26 which supports two relatively stiff wire leads 28. These leads are connected to conductive lands 30 on the upper side of the tabbing board. Alternatively the lands 30 could be on the bottom side of the board away from the magnet if the magnet should be of a conductive material. The ends 32 of coil 18 are soldered to lands 30. In this connection it is to be observed that the magnet disc 24 is smaller than the inside diameter of the housing so as to allow room to bring the ends of the coil down to the tabbing board. The foregoing magnetic assembly is preassembled prior to insertion in the housing.

The entire assembly is retained within the housing by a back filling of a suitable potting compound 34. As an optional measure, additional potting 34A may be applied to fill the space between the bobbin and the tabbing board so as to support the ends of the coil.

The illustrated embodiment further includes a ball-shaped rotor 36, conveniently referred to as a ball, disposed within the cup 10. Approximately one half of its spherical surface is one color and the other half is a different color. Typically, one half is red or black and the other half is white so as to maximize color contrast. Preferably the ball is made of plastic but it could be made of other materials. The ball 36 is sized so as to fit loosely within the cup. Preferably it is just small enough to contact the cup at only two regions of limited area without at the same time contacting the pane 8. This allows ample freedom of movement of the ball and minimizes frictional contact. Disposed within the ball is a permanent bar magnet 40. In the illustrated embodiment, the magnet is positioned so that its south pole is in the white half of the ball and its north pole is in the dark side of the ball. As an alternative measure, the ball 36 may be made of a moldable magnetic material magnetized across the diameter to provide localized poles. In either event the magnet may be referred to as a bar magnet.

With the foregoing arrangement, using soft iron for the core 22, the field of the permanent ceramic magnet 24 is channeled by the core, rendering its upper end a south pole and its bottom end a north pole. This field influences the permanent magnet 40 within the ball so that, with coil 18 deenergized, the ball assumes the polar orientation of FIG. 1 where the north end of bar magnet 40 is proximate to the upper end of the soft iron core 22. Thus, normally the white side of the ball is displayed in the window 6. However, if the leads 28 are connected to an energizing source of suitable polarity and magnitude, the coil will produce a magnetic field that is opposite to and of greater magnitude than that of the magnet 24, thereby causing the upper end of the core to be a north pole instead of a south pole, as shown in FIG. 1A. When this occurs, the north pole of the magnet 40 is repelled and the ball will rotate until the south pole of magnet 40 lies closest to the soft iron core and the dark side of the ball is visible through the window. The dark side of the ball will continue to be displayed until the coil is deenergized. This restores the soft iron core to its original condition wherein its top end acts as an extension of the south pole of the ceramic magnet 24, whereupon magnet 40 is repelled and the ball rotates back to its original position with its white side visible in the window.

It is believed to be apparent that the device of FIG. 1 and 1A is a two-position device adapted to provide binary indication; it normally provides a first indication until the electromagnet is energized, and thereafter it provides a second indication for the duration of the period that the coil is energized. This mode of operation renders it particularly suitable for alpha-numeric display systems wherein characters are formed by a number of individual indicator elements operating in selected arrangements. By way of example, FIG. 2 schematically illustrates an alpha-numeric display board comprising twenty-one indicators 44 of the kind illustrated in FIG. 1 arranged in a parallelogram array. With such an array, it is possible to indicate a variety of alpha-numeric symbols by selected energization of the several indicators. In this connection, it is to be appreciated that normally all of the indicators will be in the same state (all white or all black). To produce a desired symbol, certain of the indicators will be energized (or deenergized) so as to reverse their display. The indicators which are left in the same condition (or the indicators which are changed) provide or define the desired alpha-numeric symbol. By way of example, assume that the background and each of the indicators in FIG. 2 are normally white and that it is desired to display the number 8. To achieve this, all of the indicators will be energized except the indicators 44a and 44b. In a similar manner, the numeral 3 can be formed by energizing all of the indicators except the indicators 44a, 44b, 44c and 44d. Further by way of example, the letter E can be defined by energizing all of the indicators except the indicators 44a, 44b, 44e, 44f, 44g and 44h. A particular advantage of the system represented in FIG. 2 is that the various alpha-numeric symbols can be produced with a minimum of circuitry.

FIG. 3 illustrates how the principles of the invention can be employed to provide a latching indicator. This second form of the invention comprises a cylindrical housing 46 which is similar in shape to the case 2 and thus has an internal flange 48 defining a window 50. Flange 48 acts as a retainer for a transparent pane 52. Disposed within the housing in series relation are two ball and cup assemblies substantially identical to the one shown in FIG. 1. To facilitate description of the mode of operation of the device, the cup nearest the pane 52 is identified as 56A and the transmitting rotor or ball associated therewith as 58A. The magnet within ball 58A is identified as 60A. The corresponding elements of the second assembly are identified as cup 56B, rotor 58B, and magnet 60B. The first cup 56A is held tight against pane 52 by an opaque non-magnetic spacer 62 which may be cemented to the housing or maintained in place by cup 56B. The spacer also serves to maintain a gap between the two balls.

Also within the housing 46 is an electromagnet assembly comprising a bobbin 64 carrying a coil 66 and a soft iron core 68 disposed within the hollow stem 70 of the bobbin. The soft iron core projects above the bobbin and the latter is positioned so that the top end of the core engages cup 56B. A tabbing board 72 is cemented to the bottom end of the bobbin. The tabbing board carries two relatively stiff terminal leads 74 to which are soldered the ends of coil 66. A suitable potting compound 76 secures the electromagnet assembly within the housing.

In the embodiment of FIG. 3 just described, the two balls latch together magnetically (without coil current) with sufficient force to provide good stability under vibration and shock. The mode of operation is straightforward. Assume at the outset that the coil is deenergized and that the orientation of the balls is exactly opposite to that shown in FIG. 3 (that is, the south pole of magnet 60A is adjacent to the north pole of magnet 60B and the dark side of ball 58A is in the "up" or "display" position). Now if coil 66 is energized so that its magnetic field induces a south pole at the top end of core 68, the south pole of the magnet in ball 58B will be repelled and this repulsion will cause ball 58B to shift its orientation sufficient to remove its north pole from the influence of the south pole of ball 58A and bring it under the influence of the south pole of the core. As the south pole of magnet 60B moves into its new orientation, it exerts a repelling influence on the south pole of magnet 60A sufficient to reverse the position of ball 58A and place its white side on display in the window 50. The new position of the balls and their magnets is as shown in FIG. 3. The coil is energized just long enough to cause the balls to reverse their positions. When the coil is deenergized, the balls will remain in their new positions by virtue of the mutual latching effected by magnets 60A and 60B. To reverse the indication provided by ball 58A, the coil must be energized with a current pulse of polarity opposite to the initial current pulse.

It is to be noted that the embodiment of FIG. 3 differs from that of FIG. 1 in that it locks in either indication, and does not employ a fixed permanent magnet like magnet 24 to constantly bias the device to fixed "off" position. It should also be noted that the color of ball 58B is irrelevant since it does not function as an indicator.

FIG. 4 shows a further variation of the invention which features magnetic latching coupled with manual resetting. This third form of the invention comprises a cylindrical case 80 which as formed is open at both ends. The upper end is provided with an internal flange 82 which defines an aperture 84. Slidably disposed within case 80 is a cylindrical housing 86 which protrudes through aperture 84 and is provided with a peripheral flange 88. The latter coacts with flange 82 to limit the extent to which housing 86 can protrude from case 80. Flange 86 is urged against flange 82 by compression coil spring 90 which surrounds housing 86 and is retained in the case by an end plate 92. This end plate is cemented to the case after housing 86 and spring 90 have been inserted. A permanent disc magnet 94 polarized as shown is attached to the center of the inner side of end plate 92. Secured within housing 86 are two identical cup and ball assemblies of the character previously described. More specifically these assemblies comprise cups 96A and 96B and balls 98A and 98B with permanent bar magnets 100A and 100B. Ball 98A is half white and half red. An opaque non-magnetic spacer 102 separates the two cups and a transparent pane 104 covers cup 96A so as to loosely captivate ball 98A. Also secured within the housing is an electromagnet assembly comprising a bobbin 106, a coil 108, a soft iron core 110 cemented to the bobbin, and a tabbing board 112 with two terminal leads 114. The ends of coil 108 are connected to leads 114. The upper end of the core engages cup 96B while its other end projects below the bobbin and also housing 86 through a center hole in the tabbing board. The latter is cemented to the bobbin and a potting compound 118 is used to seal the tabbing board and reinforce the terminal leads. The leads project through holes 120 in end plate 92. Holes 120 are oversize so as to allow leads 114 to move with housing 86 relative to end plate 92. In this connection it is to be observed that movement of housing 86 toward end plate 92 is limited by engagement of core 110 with permanent magnet 94.

Although FIG. 4 shows the indicator in the "Red" condition achieved by energizing coil 108, it normally is latched in the reverse or white condition with the polarities of ball magnets 100A and 100B opposite to those shown. Coil 108 is energized by a current pulse that causes core 110 to exhibit the polarity indicated in the drawing. After coil 110 is deenergized, core 110 continues to exhibit the same polarity under the influence of magnet 100B. The indicator is reset to the "White" condition by pressing housing 86 in so that core 110 contacts permanent magnet 94. The latter has a stronger field than bar magnet 100B and, therefore, it causes a reversal in the polarity of core 110. As a consequence of this reversal of polarity, magnet 100B is repelled by core 110 and ball 98B quickly reverses itself so that the north pole of its magnet is nearest to the core. Ball 98A undergoes a corresponding reversal so that its white side is exposed to view through pane 104.

It is to be noted that an indicator with magnetic latching can be achieved without using two balls as required by the embodiments of FIGS. 3 and 4. This alternative approaches uses an assemblage of elements the same as in the embodiment of FIG. 1, but omitting permanent magnet 24 and substituting for soft iron core 22 a hardened steel core. Preferably the steel core combines the shapes of and occupies the same space as soft iron core 22 and permanent magnet 24, so that FIG. 1 suffices as an illustration of this alternative embodiment. Substitution of the hardened steel core to achieve latching involves pulsing coil 18 with pulses of opposite polarity to get reversal. The mode of operation is straightforward. Pulsing of the coil to cause rotation of ball 36 in the manner previously described causes the steel core to become permanently magnetized. After the pulse has passed the residual magnetism of the steel core latches the ball so that it cannot return to its original orientation. It will remain latched until the coil is energized with a pulse of opposite polarity. The magnetic field produced by the coil when subjected to this second opposite polarity pulse not only restores the ball to its original position but also reverses the permanent magnetism in the core; the latter magnetism latches the ball in the restored position until a new pulse is applied with a polarity opposite to that required to achieve the aforesaid restored position. Of course, it is recognized that magnetic latching can be achieved without substituting a hardened steel core for soft iron core 22 and magnet 24, but merely by omitting magnet 24. The permanent magnetism embodied in the ball 36 will coact with the soft iron core to oppose reversal of the ball. However, the degree of latching achieved in this manner is at least one order of magnitude less than that achieved by using a permanently magnetizable core and, for the most part, is inadequate to prevent a change of indication due to shock and vibration of the type and magnitude normally incurred in practice.

It is appreciated that the invention is capable of still other variations and that the parts and materials used in the illustrated embodiments may be modified extensively without departing from the principles of the invention. Thus, for example, the ball may be made of plastic, rubber, or of any other suitable material, while the housing, transparent pane, bobbin, etc. can be made of many different materials without affecting the mode of operation of the device. By the same token, it is to be appreciated that the fixed magnets 24 and 94 employed in the devices of FIGS. 1 and 4 may be disposed with reverse polarity, provided that a corresponding change is made in the polarity of the current pulse used to energize the electromagnet. Furthermore, as an alternative to pulsing the same coil with opposite polarity to get reversal in the manner of the embodiment of FIG. 3 (or the embodiment of FIG. 1 using a hardened steel core as described in the previous paragraph), an extra coil can be provided on the same bobbin, with one connected for positive pulsing and the other connected for negative pulsing. Another obvious change is to provide other indicia such as a zero or a star on the balls in addition to or in place of coloring their surfaces in the manner previously described. It also is clear that a cup is not required to retain the ball; a retaining ring may be substituted for the cup. However, a cup sized as described above is preferred over a retaining ring. To minimize contact, the retaining ring could be formed with a serrated inner edge so that it will contact the ball only at spaced points. It is also considered that the cup may be formed with a somewhat conical rather than perfectly cylindrical interior, with the pitch of the cup's inner surface being such that it contacts the ball below its horizontal center line. The terms "cup shaped" and "generally cylindrical" have been used for convenience to characterize the nature of the confining structure even though portions of the cup or cylinder, not required for actual confinement, are omitted.

I claim:

1. An electromagnetic indicator comprising, in combination, a core of magnetic material, a coil surrounding the core, a rotor in the form of a smoothly surfaced ball having a permanent bar magnet therein, a cup-shaped receptacle for the rotor opposite one end of the core for magnetic coupling to the latter, the surfaces of the ball adjacent the respective poles of the permanent magnet being finished to present distinctively different appearance, the receptacle being formed of anti-friction material having a generally cylindrical cavity providing greater axial and diametric dimension than the rotor for confining the rotor while enabling freedom of movement of the rotor in all directions, said receptacle having a transparent window for viewing the outwardly presented surface of the rotor, the rotor being supported by the receptacle spaced from the core in all rotor positions yet magnetically coupled to the core to produce rotation of the rotor end-for-end upon a change in the polarity of the presented end of the core.

2. The combination as claimed in claim 1 in which the surfaces engaged by the rotor are formed of slippery plastic material having the characteristics of polytetrafluoroethylene.

3. The combination as claimed in claim 1 in which the core is made of magnetically retentive material to provide residual magnetism to assist in the holding of the rotor in position following receipt of an electric pulse by the coil.

4. The combination as claimed in claim 1 in which an auxiliary permanent magnet is provided at the remote end of the core to produce a reference magnetic polarity at the presented end of the core, thereby to establish reference orientation of the rotor and in which means are provided for energizing the coil to bring about a reversal of the polarity at the presented end of the core for turning of the rotor end-for-end.

5. The combination as claimed in claim 1 including a cylindrical housing in which the coil and cup-shaped receptacle are telescoped in stacked relation in the housing, the housing having a window at its outer end for viewing the presented distinctive surface of the rotor.

6. An electromagnetic indicator comprising, in combination, a core of magnetic material, a coil surrounding the core, a ball-shaped rotor having a permanent bar magnet therein, a receptacle at the presented end of the core dimensioned to contain the rotor for free rotation of the latter therein from a reference position to an inverted position when the coil is energized, a housing for the coil and receptacle, the housing having a window for viewing the rotor for indication of whether the rotor is in its reference position or inverted position, the housing being spring mounted for endwise movement, a relatively fixed permanent magnet axially arranged opposite the remote end of the core so that when the housing is pressed inwardly against the spring bringing the core into proximity with the fixed permanent magnet, magnetism is set up in the core of a polarity to cause return of the rotor to its reference position.

7. An electromagnetic indicator comprising, in combination, a core of magnetic material, a coil surrounding the core, first and second generally cylindrical receptacles in stacked relation with respect to the core, the first receptacle having a ball-shaped transmitting rotor therein containing a permanent bar magnet positioned in alinement with the core and with its polar orientation depending upon the polarity of the presented end of the core, the second receptacle having a ball-shaped indicating rotor therein having a permanent bar magnet alined with the bar magnet in the first rotor and having a polar orientation depending upon the presented end of the bar magnet in the first rotor, the receptacles being sufficiently close to one another and to the presented end of the core and the receptacles presenting such low coefficient of friction that a reversal in the polarity in the core is effective to turn the transmitting rotor end-for-end accompanied by turning of the indicating rotor end-for-end to change the indication.

8. The combination as claimed in claim 7 in which the engaged surfaces between the rotors and their receptacles are surfaced with an anti-friction material having the characteristics of polytetrafluoroethylene and in which the rotors have limited freedom of movement in their respective receptacles in all directions.

9. An electromagnetic indicator comprising, in combination, a core of magnetic material, a coil surrounding the core, a first permanent magnet mounted adjacent the end of the core and freely rotatable for movement from a first position to a second position when the coil is energized, a second permanent magnet mounted beyond the first permanent magnet and freely rotatable for movement from a first position to a second position as a result of the reversal of magnetism as the first permanent magnet moves to its second position, the ends of the second permanent magnet being distinctively finished for visual indication of position, the permanent magnets being coupled sufficiently closely so that they magnetically lock on one another in a position of alinement with the result that the permanent magnets are effectively latched in position in spite of the subsequent deenergization of the coil, and means for momentarily reversing the polarity of the core so that each of the permanent magnets is turned end-for-end for latching in opposite position.

References Cited

UNITED STATES PATENTS

| | | | |
|---|---|---|---|
| Re. 24,943 | 2/1961 | Skrobisch | 340—373 |
| 3,309,696 | 3/1967 | Alster et al. | 340—373 |
| 3,267,455 | 8/1966 | McGuire et al. | 340—373 X |
| 2,901,727 | 8/1959 | Henn-Collins | 340—324 |
| 3,025,512 | 3/1962 | Bloechl | 340—373 |
| 3,036,300 | 5/1962 | Knight | 340—373 |

JOHN W. CALDWELL, Primary Examiner

HAROLD I. PITTS, Assistant Examiner

U.S. Cl. X.R.

310—103, 104; 335—220; 340—324, 366, 381